United States Patent
De Smedt et al.

(10) Patent No.: US 8,411,678 B2
(45) Date of Patent: Apr. 2, 2013

(54) METHOD AND A GATEWAY FOR PROVIDING MULTIPLE INTERNET ACCESS

(75) Inventors: Alex De Smedt, Edegem (BE); Dirk Van De Poel, Edegem (BE)

(73) Assignee: Thomson Licensing, Boulogne-Billancourt (FR)

(*) Notice: Subject to any disclaimer, the term of this patent is extended or adjusted under 35 U.S.C. 154(b) by 241 days.

(21) Appl. No.: 12/998,111

(22) PCT Filed: Aug. 27, 2009

(86) PCT No.: PCT/EP2009/061066
§ 371 (c)(1), (2), (4) Date: Mar. 18, 2011

(87) PCT Pub. No.: WO2010/031668
PCT Pub. Date: Mar. 25, 2010

(65) Prior Publication Data
US 2011/0170554 A1    Jul. 14, 2011

(30) Foreign Application Priority Data
Sep. 18, 2008  (EP) .................................. 08447039

(51) Int. Cl.
*H04L 12/28*   (2006.01)
(52) U.S. Cl. ........................ 370/389; 370/401
(58) Field of Classification Search .............. 370/389, 370/392, 401, 475
See application file for complete search history.

(56) References Cited

U.S. PATENT DOCUMENTS

| | | | |
|---|---|---|---|
| 7,920,549 B2* | 4/2011 | Alt et al. ...................... | 370/352 |
| 2004/0004968 A1 | 1/2004 | Nassar | |
| 2004/0052216 A1* | 3/2004 | Roh .............................. | 370/252 |
| 2007/0025372 A1* | 2/2007 | Brenes et al. ................. | 370/401 |
| 2009/0116487 A1* | 5/2009 | Read ............................ | 370/392 |

FOREIGN PATENT DOCUMENTS

WO    WO-03077143    9/2003

OTHER PUBLICATIONS

Search Rept:Feb. 12, 2010.

* cited by examiner

*Primary Examiner* — Hong Cho
(74) *Attorney, Agent, or Firm* — Robert D. Shedd; Jorge Tony Villabon

(57) ABSTRACT

The present invention concerns a gateway and a method at a gateway for providing multiple accesses to an IP based network, the gateway comprising an interface to a first network, an interface to a second network, the gateway being connected to the IP based network with a first network provider on a first connection through the second network. The method comprises the steps of detecting a request from a device located on the first network to connect to the IP based network with a second network provider, setting up a second connection to the IP based network through the second network with a second network provider, and connecting the device to the IP based network with the second connection.

11 Claims, 2 Drawing Sheets

METHOD AND A GATEWAY FOR PROVIDING MULTIPLE INTERNET ACCESS

This application claims the benefit, under 35 U.S.C. §365 of International Application PCT/EP2009/061066, filed Aug. 27, 2009, which was published in accordance with PCT Article 21(2) on Mar. 25, 2010 in English and which claims the benefit of European patent application No. 08447039.2, filed Sep. 18, 2008.

FIELD OF THE INVENTION

The present invention relates generally to access to an IP based network at a gateway and in particular to a gateway that provides multiple accesses to the IP based network with multiple network providers.

BACKGROUND OF THE INVENTION

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

A gateway is a communication device that interfaces a first network, generally a local area network, to a second network, generally an IP based public network such as the Internet. Access to the Internet is provided by an Internet Service Provider, ISP, also called a network service provider, NSP. The ISP provides a public Internet address to the gateway. The gateway gets the public IP address from an ISP server located on the Internet with the Dynamic Host Configuration Protocol DHCP as defined in the IETF RFC 2131 (Internet Engineering Task Force—Request for Comments). The gateway generally comprises a DHCP server that is adapted to provide private IP addresses to devices on the local area network. The gateway also comprises a Network Address Port Translation NAPT router compliant with the IETF RFC 3022. This enables the local devices to access the Internet through the gateway using the global IP address. The Internet access is provided at the gateway side, whatever the device on the local area network.

If an end user wants to connect to Internet with more than one NSP, he needs more than one gateway, where each gateway connects with a different NSP, each NSP using a different IP subnet.

SUMMARY OF THE INVENTION

The present invention attempts to remedy at least some of the concerns connected with IP based networks connectivity in the prior art, by providing a method in a gateway for obtaining more than one connection for connecting to an IP based network.

The present invention concerns a method at a gateway for providing multiple accesses to an IP based network, the gateway comprising an interface to a first network, an interface to a second network, the gateway being connected to the IP base network with a first network provider on a first connection through the second network. To this end the invention relates to a method comprising the steps of detecting a request from a device located on the first network to connect to the IP base network with a second network provider, setting up a second connection to the IP base network through the second network with a second network provider, and connecting the device to the IP base network with the second connection.

The gateway uses a first connection from a first network provider to connect to the IP base network. It also enables a device to connect to the IP base network using a second network provider different from the first network provider. The connection is automatically performed on detection of a device requesting connection to the IP base network with a network provider different from the first network provider. The second connection doesn't use the first connection. It is a connection of the same type as the first connection, which uses a network provider different from the first network provider. When the second connection is set up, the gateway uses the second connection for the IP base network transaction to and from the device;

Of course, it also enables another device to connect to the IP base network using another connection different from the first and the second connection.

According to an embodiment of the invention, the method comprises the steps of detecting a request from a second device located on the first network to connect to the IP base network with the second network provider; and connecting the second device to the IP base network with the second connection.

When a second local device requests to connect with the same second network provider, the gateway uses the second connection to connect the second device to the IP base network. It doesn't set up a third connection to connect the second device with the second network provider.

According to an embodiment of the invention, the step of setting up a second connection comprises the steps of forwarding the request to set up a second connection to the said second network provider, using the first connection, and receiving, on the first connection, a response from the second network provider, enabling to use the second connection.

According to an embodiment of the invention, the step of detecting a request comprises the step of receiving a DHCP request, wherein the DHCP request comprises an indication that it is destined to the second network provider.

According to an embodiment of the invention, the first network is a local area network and the second network is a wide area network.

According to an embodiment of the invention, the step of receiving a response from the second network provider comprises the step of receiving a public address from the second network provider, and the step of connecting the device to the IP base network with the second connection comprises the steps of allocating a local address to the device, and mapping the local address to the public address, wherein the gateway is connected to the IP base network with the public address.

According to an embodiment of the invention, the addresses are the IP base network Protocol addresses.

According to an embodiment of the invention, the method comprises the step of detecting that a device connected to the IP base network with the second connection has left the first network or releases the connection to the IP base network with second network provider, and if no other device is connected to the IP base network with the second connection, releasing the second connection.

Another object of the invention is a gateway for providing multiple accesses to an IP base network, the gateway comprising an interface to a first network, an interface to a second network, the gateway being connected to the IP base network with a first network provider on with a first connection through the second network, the gateway comprising detecting means for detecting a request from a device located on the first network to connect to the IP base network with a second network provider; and connecting means for setting up a second connection to the IP base network with a second network provider through the second network, and for connecting the device to the second connection.

According to an embodiment, the detecting means are adapted to detect when no device is connected to the IP base network with the second network provider, and connecting means are adapted to release the second connection.

Certain aspects commensurate in scope with the disclosed embodiments are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

BRIEF DESCRIPTION OF THE DRAWINGS

The invention will be better understood and illustrated by means of the following embodiment and execution examples, in no way limitative, with reference to the appended figures on which:

In FIG. 1, the represented blocks are purely functional entities, which do not necessarily correspond to physically separate entities. Namely, they could be developed in the form of hardware or software, or be implemented in one or several integrated circuits.

DETAILED DESCRIPTION OF PREFERRED EMBODIMENTS

Figure 1:
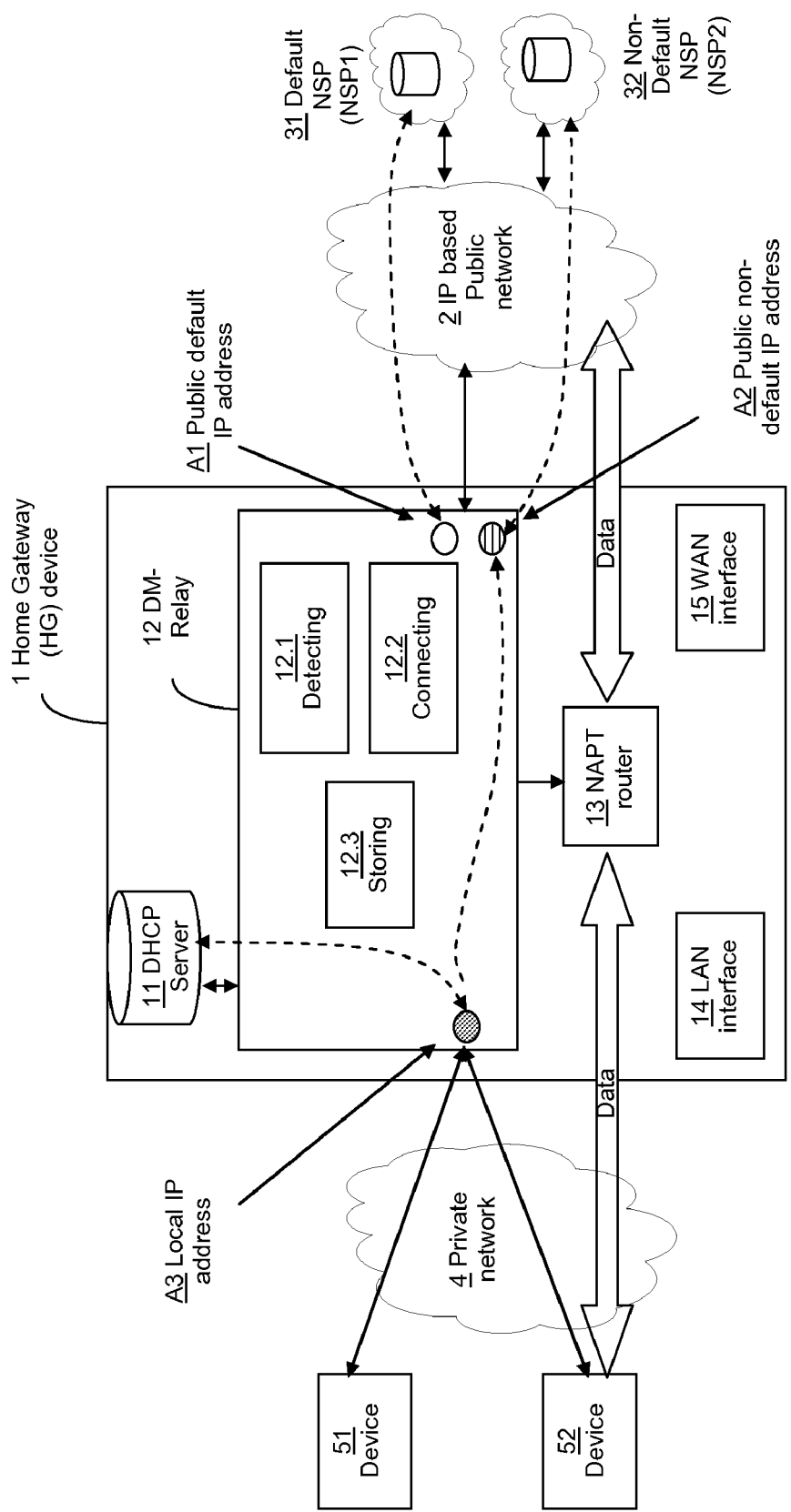
FIG. 1 represents a system according to the embodiment.

The system according to the embodiment is illustrated in FIG. 1. A gateway 1 is connected to a local area network 4 and a public network 2. The local area network is an Ethernet type network. Of course it might be any type of wired or wireless LAN technology. The gateway might also comprise more than one connection to more than one LAN. The public network is an IP based network. According to the embodiment the IP based network is the Internet, but it might be any other type of IP based networks such as an IP network used to provide IPTV. The gateway obtains a connection to the Internet with a Network Service Provider, NSP. A first NSP, the default NSP 31, provides a default public IP address A1 to the gateway. A non-default NSP 32 provides a non-default public IP address A2 to the gateway as described hereinafter. The gateway enables the devices 51 and 52 of the local area network 4 to access the Internet 2. The device 51 accesses the Internet with the default NSP. The device 52 accesses the Internet with the non-default NSP.

The default NSP is the NSP that provides IP network access to the gateway. The non-default NSP provides IP network services. The IP access provided by the default NSP is used by the non-default NSP to set up the connection. More generally the NSP might be a network provider, offering IP based network access.

The gateway device 1 of the embodiment is a Digital Subscriber Line gateway that provides Internet broadband access through the DSL technology. Of course the gateway could be any type of broadband gateway such as cable, fiber or wireless. It comprises a LAN interface 14 and a WAN interface 15. It comprises a DHCP server 11 for managing a set of private IP addresses on the local network 4. It comprises a NAPT router 13. It comprises also a detecting module 12.1 that is adapted to detect that a device located on the first network requests to connect to the Internet using a non-default NSPn and for detecting that a device connected to Internet with a non-default NSPn has left the local network or has released the connection to the non-default NSPn. It also comprises a connecting module 12.2 for connecting and disconnecting the gateway to the NSPn. It comprises a memory 12.3 for storing the list of devices connected to each NSPn.

According to the embodiment, the detecting module 12.1, the connecting module 12.2 and the memory 12.3 are comprised in a relaying module 12. In particular the relaying module is a DHCP multiprovider relay module 12, also noted DM-Relay. It interacts with the local DHCP server 11, and with the DHCP server of the NSPn. It also interacts with the NAPT router 13 for mapping the gateway public IP address to the local device IP address. It assigns a local IP address to a local device that request access to Internet through a NSPn and passes the necessary IP configuration data received from NSPn to that local device. More generally, the functions of the DM-Relay are similar to the one of a DHCP relay agent as specified in RFC 3046. A DHCP relay agent inserts Relay Agent Information option when forwarding client-originated DHCP packets to a DHCP server. Additionally, the DM-Relay performs the following functions:

recognition of a request to a new NSPn. This is based on particular DHCP parameters indicated hereinafter;

changing the received DHCP message IP addresses by its own IP address on reception of the DHCP ACK message at the WAN side; in particular it changes the 'Your IP address' parameter of the received DHCP ACK message by a private address for the device and it changes the 'Gateway IP address' parameter by its own LAN side IP private address;

configuring this received 'Your IP address' on the WAN interface, as the public address of the gateway is related to the NSPn (IP@NSPn), and configuring the NAPT function;

passing IP configuration parameters to the LAN side; these parameters can be the server IP address, the server host name and some DHCP options;

upon reception of a request to release or renew the network address from a local device, the gateway forwards the DHCP message to the NSPn DHCP server, while replacing the device private address with the public IP address IP@NSPn;

when all local devices connected to an NSPn have left connectivity to NSPn, the public IP address of the gateway related to NSPn is removed from the gateway WAN interface. Alternatively the gateway keeps the connection or stores that address for further connections to that NSPn.

The DM-Relay also keeps a list of the registered NSPn and the corresponding IP@NSPn addresses.

The procedure for getting access with a NSPn is now described. A local device on the local area network uses the broadband network access provided by the NSP1 to authenticate to the new provider NSPn, using a URL received from this new provider.

After confirmed authentication, the device sends a DHCP request to the home gateway. As further detailed hereinafter, the home gateway forwards the DHCP request on the WAN link to the new provider network. When the DHCP IP configuration data, including the public IP address in the new IP subnet, are received by the home gateway from the provider DHCP server, the home gateway keeps the assigned public IP address and assigns a private local address to the device. The public IP address is valid on the WAN interface, enabling IP forwarding between the device private address and this public address. The private IP address assignment may be achieved by replacing the assigned public IP address in the received DHCP-ACK message with a private address, and to pass the modified message to the device. From then on all messages received on the public IP address are forwarded to the local device together with applying network address translation.

When a second local device sends a DHCP request to such a non-default NSPn that has been registered at the gateway, the gateway assigns a private IP address to this second local device. It also configures the NAPT accordingly. It links the private IP address to the public IP address related to that NSPn. The NAPT function is configured to map traffic from local devices with private IP to a specific public IP address. Each time NAT does translate an outgoing (LAN→WAN) message, it remembers the translation it did so it can do the opposite for incoming traffic from the Internet. In that case, the gateway doesn't send any message to the NSPn DHCP server.

The gateway is also controlling when a device releases its connection to a NSPn. To release its connection with a NSPn, a device sends a release message to the DHCP server. In particular, the release message is a DHCP release. The gateway intercepts that message, which is not forwarded to the NSPn DHCP server. The gateway also performs the detection of whether a device is still connected to the local network.

When the gateway detects that no more device is mapped to a public IP address of a NSPn, it releases the connection to that NSPn. The public IP address of the gateway to NSPn is released. The gateway sends a release message to the NSPn DHCP server. In particular, the release message is a DHCP release. In particular, the gateway waits for a delay before releasing the connection; this prevents from setting again a connection if a device request to set up a connection during the delay.

Figure 2:
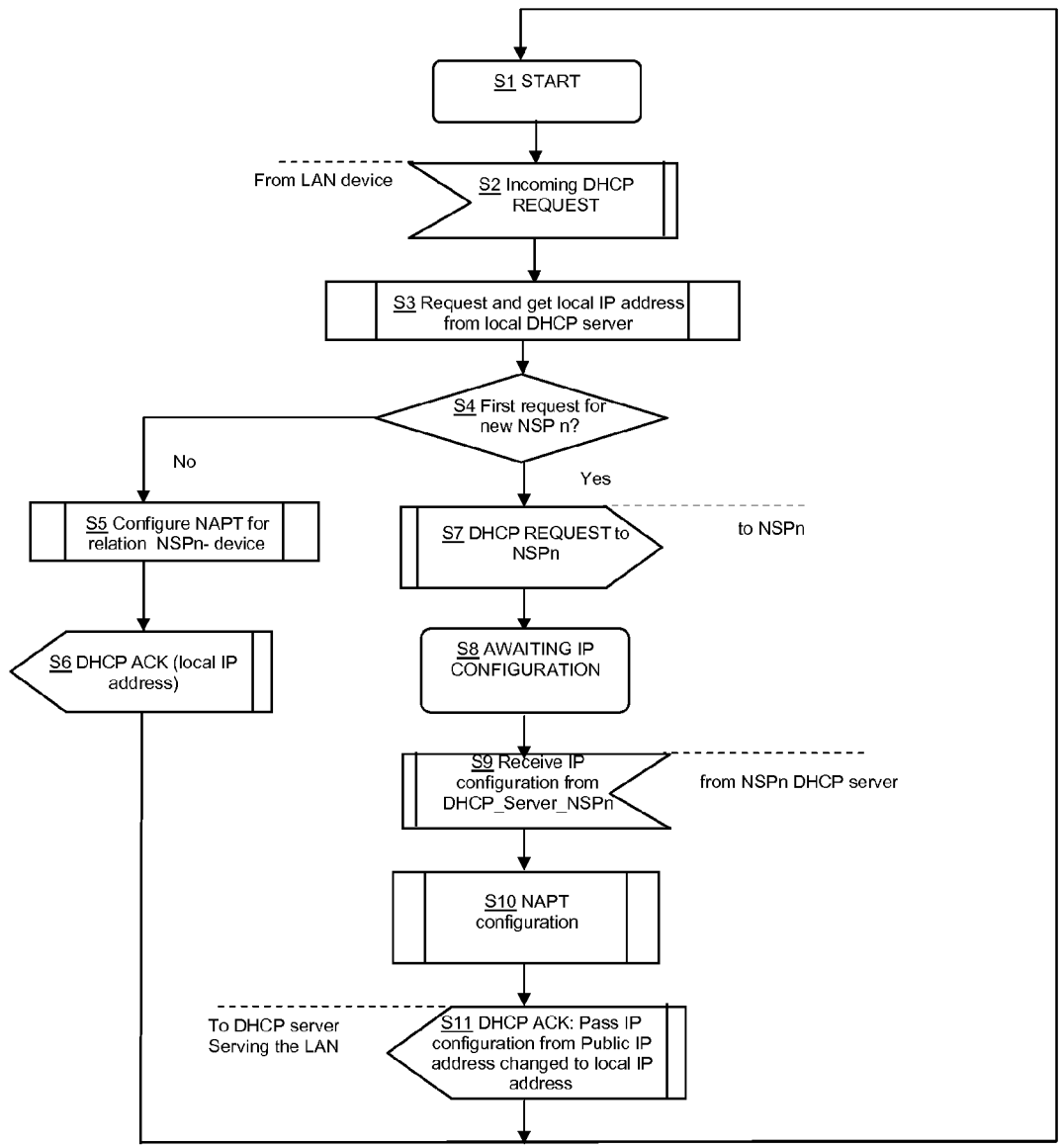
FIG. 2 is a flow chart of a procedure according to the embodiment.

A flowchart of a procedure at a DHCP Multi-provider Relay for setting up a connection to a NSPn is represented in FIG. 2.

The DM-Relay module of the gateway receives a DHCP REQUEST message from a device on the LAN, step S2. That is a broadcast message that requests parameters from one DHCP server located on the Internet, which corresponds to a server of NSPn. The DHCP REQUEST message comprises identification that the request is destined to a particular NSP. This is indicated in the vendor specific option 125, as defined in IETF RFC 3925. Of course, this could be indicated with any DHCP optional carried information that would identify a request for a particular NSP. This could then be the option 43 carried information or any DHCP option that carries a NSP identification such as option 60 or an option defined by the NSPs.

The DM-Relay module requests and gets a local IP address from the local DHCP server 11, step S3.

The DM-Relay then checks if this is the first request to get an IP address from that NSPn, S4. I.e. it checks in the list of NSPn whether that NSPn has already been used by another local device. The request of a public IP address to a DHCP server of NSPn only happens for the first local device needing connectivity to the NSPn. If it has already been used, the DM-Relay configures the NAPT to link the local device to that NSPn, step S5. Then it sends a DHCP ACK message with the local IP address to the local device, step S6.

If this is the first request to the NSPn, the DM-Relay forwards the DHCP REQUEST to the NSPn DHCP server, step S7; and waits for the IP configuration, step S8. At step S9 it receives a DHCP ACK message, which comprises the IP public address, from the NSPn DHCP server. The DM-Relay broadcasts the DHCP REQUEST on the WAN network; each NSP DHCP server sees the message and knows whether or not to respond. Alternatively the DM-Relay sends the DHCP discover to a specific NSP DHCP server IP address according to a DHCP relay forwarding policy which is out of the scope of the invention. This policy is pre-determined and managed by the default NSP.

The received public address is stored at the gateway. The DM-Relay configures the NAPT to map the public IP address to the local IP address in the router, step S10.

At step S11, the DM-Relay sends a DHCP ACK to the local device with the local IP address.

After the configuration is done, the device uses a private IP address and receives all DHCP options from the DHCP server of the NSPn. As all options are passed to the device, the device can act as being directly connected to the network. The gateway has got a public IP address in the IP subnet range of the new provider, which is mapped to the private address of the device in NAPT. The device is addressable via this public address.

The embodiment deals with a default NSPn and a non-default NSPn. Of course the embodiment could comprise more than one non-default NSPn. The gateway would manage each non-default NSPn independently from each others. A local device could access Internet through more than one non-default NSPn, depending on the application used at the terminal. Illustratively, the local device could access video services with a first NSPn, and voice services with a second NSPn.

Advantageously, a local device sets up multiple accesses to Internet with the same NSPn. It sets up multiple connections to Internet. For example, it accesses video services with a first connection obtained from a NSPn, and voice services with a second connection obtained from the same NSPn.

It will also be appreciated that any protocol other than DHCP could be used to provide network addresses.

According to the embodiment, a local device requests a connection to a non-default NSPn. Of course the connection could be requested from an application on the gateway. The gateway itself might then be considered as a local device.

References disclosed in the description, the claims and the drawings may be provided independently or in any appropriate combination. Features may, where appropriate, be implemented in hardware, software, or a combination of the two.

Reference herein to "one embodiment" or "an embodiment" means that a particular feature, structure, or characteristic described in connection with the embodiment can be included in at least one implementation of the invention. The appearances of the phrase "in one embodiment" in various places in the specification are not necessarily all referring to the same embodiment, nor are separate or alternative embodiments necessarily mutually exclusive of other embodiments.

Reference numerals appearing in the claims are by way of illustration only and shall have no limiting effect on the scope of the claims.

The invention claimed is:

1. A method at a gateway for providing multiple accesses to an IP based network, said gateway comprising an interface to a first network, an interface to a second network, said gateway being connected to said IP based network through the second network with a first network provider at a first public IP address so that any device located in the first network accesses said IP based network through said first public IP address, said method comprising the steps of:

detecting a request from a device located on the first network to connect to the IP based network with a second network provider, forwarding the request on the IP based network using the first public IP address, receiving a response, from said second network provider, comprising a second public IP address, allocating a local address to the device, and mapping said local address to said second public IP address, so that said device accesses said IP based network through said second public IP address.

2. Method according to claim 1, wherein it comprises the steps of:

detecting a request from a second device located on the first network to connect to the IP based network with the second network provider;

allocating a local address to the device, and mapping said local address to said second public IP address, so that said device accesses said IP based network through said second public IP address.

3. Method according to claim 1, wherein that the first network is a local area network and the second network is a wide area network.

4. Method according to claim 1, wherein that said addresses are Internet Protocol addresses.

5. Method according to claim 1, wherein it comprises the steps of:

detecting that said device has left said first network or receiving a release from said device for releasing the connection to the IP based network with said second network provider, and if no other device is connected to the IP based network with said second network provider, sending a release to release the second connection to the IP network with said second network provider.

6. Method according to claim 1, the step of mapping comprising configuring a NAPT of the gateway.

7. Method according to claim 1, said request, response and release being respectively DHCP request, DHCP response and DHCP release.

8. Gateway for providing multiple accesses to an IP based network, said gateway comprising an interface to a first network, an interface to a second network, said gateway being connected to said IP based network through the second network with a first network provider at a first public IP address so that any device located in the first network accesses said IP based network through said first public IP address, said gateway comprising:

detecting means for detecting a request from a device located on the first network to connect to the IP based network with a second network provider; and connecting means for, on reception of said request, forwarding the request on the IP based network using the first public IP address, and, on reception of a response, from said second network provider, comprising a second public IP address, allocating a local address to the device, and mapping said local address to said second public IP address, so that said device accesses said IP based network through said second public IP address.

9. Gateway according to claim 8, said detecting means being adapted to detect when no device is connected to the IP based network with the second network provider.

10. Gateway according to claim 9, said connecting means being adapted to release said second connection if no other device is connected to the IP based network with said second network provider.

11. Gateway according to claim 8, said request and response being respectively a DHCP request and a DHCP response.

* * * * *